United States Patent [19]

Kage

[11] Patent Number: 4,791,669
[45] Date of Patent: Dec. 13, 1988

[54] ENCRYPTION/DECRYPTION SYSTEM

[75] Inventor: Kouzou Kage, Tokyo, Japan

[73] Assignee: NEC Corporation, Japan

[21] Appl. No.: 934,408

[22] Filed: Nov. 24, 1986

[30] Foreign Application Priority Data

Nov. 30, 1985 [JP] Japan ............................ 60-268321
Nov. 30, 1985 [JP] Japan ............................ 60-268322

[51] Int. Cl.$^4$ .............................................. H04L 9/00
[52] U.S. Cl. .................................... 380/46; 380/47; 380/50
[58] Field of Search .............. 178/22.14, 22.17, 22.18, 178/22.19; 380/28, 44, 46, 47, 48, 49, 50

[56] References Cited

U.S. PATENT DOCUMENTS

| | | | |
|---|---|---|---|
| 3,614,316 | 10/1971 | Andrews, Jr. et al. | 178/22.17 |
| 3,651,261 | 3/1972 | Guanella | 178/22.17 |
| 3,711,645 | 1/1973 | Ehrat | 178/22.17 |
| 3,740,475 | 6/1973 | Ehrat | 178/22.19 |
| 3,852,534 | 12/1974 | Tilk | 178/22.17 |
| 3,950,616 | 4/1976 | Tammaru, Tasmo | 178/22.17 |
| 3,984,668 | 10/1976 | Zetterberg et al. | 178/22.14 |
| 4,058,673 | 11/1977 | Johansson | 178/22.19 |
| 4,133,974 | 1/1979 | Morgan | 178/22.17 |
| 4,172,213 | 10/1979 | Barnes et al. | 178/22.05 |
| 4,211,891 | 7/1980 | Glitz | 178/22.19 |
| 4,305,152 | 12/1981 | Asakawa et al. | 178/22.17 |
| 4,447,672 | 5/1984 | Nakamura | 178/22.19 |
| 4,450,321 | 5/1984 | Quigley et al. | 178/22.19 |
| 4,465,153 | 8/1984 | van de Pas et al. | 178/22.19 |

Primary Examiner—Salvatore Cangialosi
Attorney, Agent, or Firm—Laff, Whitesel, Conte & Saret

[57] ABSTRACT

An encryption/decryption system for a communication channel increases the number of values for the encryption key variable without increasing the length of a cipher feedback register. This is done by providing a selector to select one from many local and prestored keys for each frame. The transmitting end has a first storage register, a first memory, a first selector, and an encrypting circuit. The encrypting circuit combines a randomized signal with the input signal to form an encrypted signal. As cipher feedback, the first storage register provides bits of the encrypted signal as addresses to the first memory, which outputs corresponding random numbers. The first selector selects from the random number data to form the coding randomized signal fed to the encrypting circuit. The receiving end has a second storage register, a second memory, a second selector, and a digital signal decoding circuit. The second storage register stores bits of a received encrypted signal and outputs them in parallel as addresses. The second memory receives these addresses and outputs corresponding random numbers. To enable decoding, the working and stored contents of the first and second memories are identical. The second selector, operating the same way that the first operates, selects from the identical random number data to form a decoding randomized signal. The decoding circuit combines the received encrypted signal with the decoding randomized signal to reproduce the input digital signal.

16 Claims, 6 Drawing Sheets

ENCRYPTION/DECRYPTION SYSTEM

This invention relates to devices for providing message secrecy and more particularly to an encryption/decryption system for insertion in a digitalized communication channel to maintain message privacy.

Communication channels, particularly radio communication links, are increasingly being used to transmit highly confidential and important data and messages between and within businesses. The need to safeguard such data from eavesdropping and unauthorized tampering has grown correspondingly. One traditional protection technique is to encrypt the data at the transmitting end and decrypt it at the receiving end.

However, previous efforts to safeguard data communications have had difficulty reconciling the need for a high level of secrecy with other important goals, such as simple construction and low cost, quick recovery from transmission errors, and minimum reduction of message throughput.

For example, certain conventional systems employ nonlinear encryption by storing a controlling encryption key variable at the transmitting and receiving ends and using a technique in which the encryption at a later time depends on the encrypted message at an earlier time. Such systems have an exceptionally high level of message secrecy. However, if provision is made for the encryption key variable to have a large number of possible values, the conventional system can become rather slow in recovering from transmission errors in the received encrypted signal. Each transmission error interferes with correct decoding, causing a blackout period during which it is impossible to correctly decrypt a corresponding portion of the message. Enabling the encryption key variable to have a greater variety of possible values lengthens the blackout period.

Accordingly, an object of this invention is to provide a new and improved encryption/decryption system which enables the encryption key variable to have a larger variety of possible values without greatly increasing the errors in the decoded signal reproduced at the receiving end. Yet another object is to provide such a device with a very high level of message secrecy without sacrificing relatively simple construction and moderate cost.

In keeping with one aspect of the invention, an encryption/decryption system for a communication channel encrypts an input digital signal at the transmitting end and reproduces it at the receiving end. The transmitting end of the system has a first storage register, a first memory, a first selector device, and an encrypted signal composing device. The encrypted signal composing device combines a randomized coding signal with the input digital signal to form an encrypted signal segmented into frames.

For additional protection, the invention uses cipher feedback. The first storage register stores bits of the encrypted signal and outputs them in parallel. The first memory receives these parallel bits as addresses and outputs corresponding random numbers. The first selector device selects from the random number data to form the randomized coding signal fed to the encrypted signal composing device.

The receiving end has a second storage register, a second memory, a second selector device, and a digital signal reproducing device. The second storage register stores bits of the received encrypted signal and outputs them in parallel. The second memory receives these parallel bits as addresses and outputs corresponding random numbers. To enable decoding, the working and stored contents of the first and second memories are identical.

The second selector device, operating the same way as the first, selects from the random number data to form a decoding signal. The digital signal reproducing device combines the received encrypted signal with the randomized decoding signal to reproduce the input digital signal.

BRIEF DESCRIPTION OF THE DRAWINGS

The above mentioned and other features of this invention and the manner of obtaining them will become more apparent, and the invention itself will be best understood, by reference to the following description of embodiments of the invention taken in conjunction with the accompanying drawings, in which:

An example of a prior art encryption device employed in a communications transmitting system is shown in FIG. 4. For decoding, FIG. 5 shows a complementary prior art decryption device employed in a communications receiving system. In the encrypted transmitting system of FIG. 4, a digital input signal S is combined by an Exclusive OR (XOR) gate 2 with a randomized digital encoding signal Y successively output from a transmitter memory unit 1. This produces an encrypted signal Z for transmission.

Figure 1:
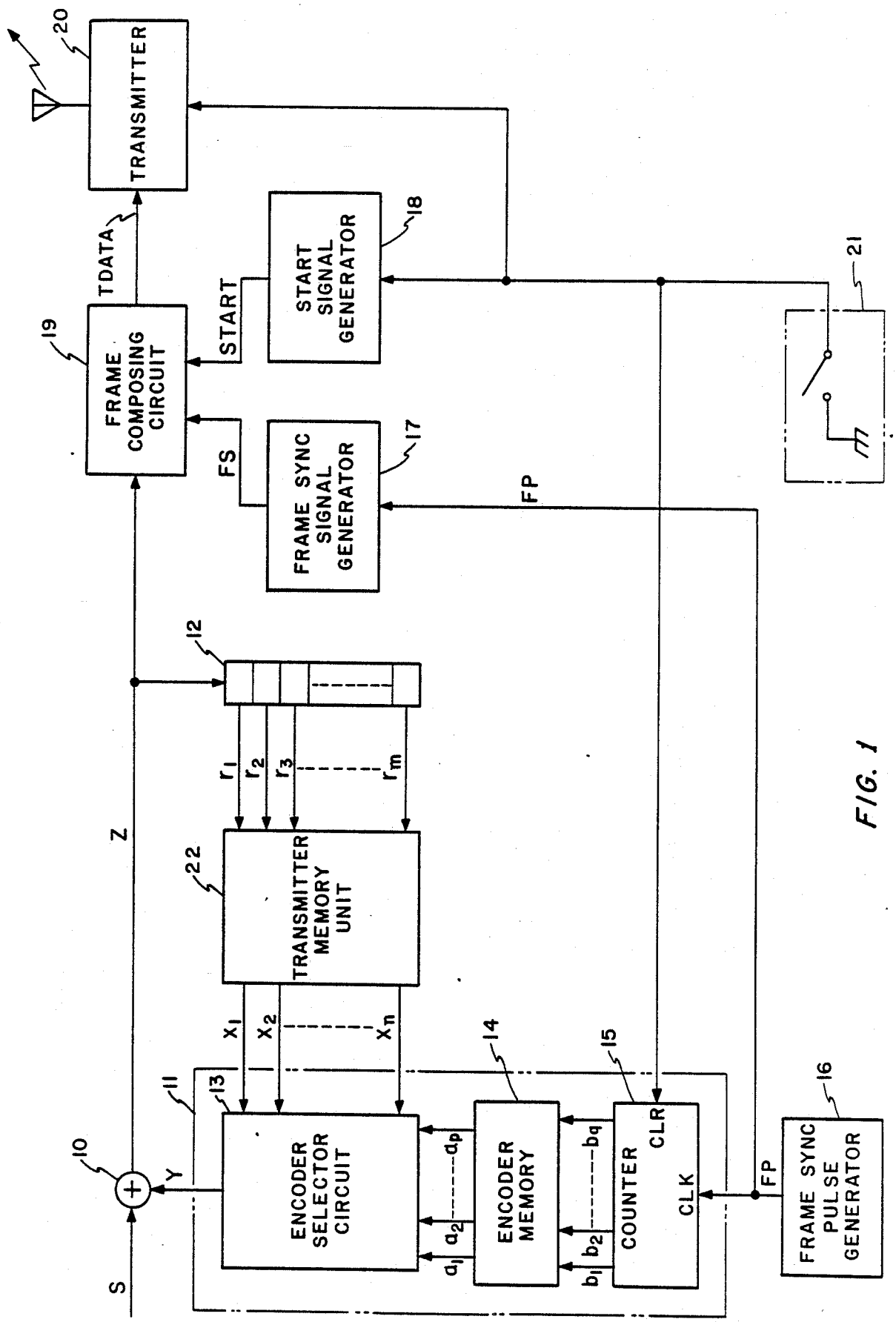
FIG. 1 is a block diagram of a first embodiment of an inventive encryption system for use at the transmitting end of a communications link.

To produce cipher feedback, the successive bits of the encrypted digital signal Z are input for temporary storage to an M bit shift register 3 as shift register bits $R_1, R_2, \ldots, R_M$. Memory unit 1 has $2^M$ addresses, each of which contains a prestored random bit, a logical 0 or 1. The register bits $R_1, R_2, \ldots, R_M$ are then used in parallel as an input address to memory unit 1, which outputs the prestored random bit at that address as the next bit of Y.

The encrypted digital signal Z is input to a transmitter 4, which transmits it whenever a transmission switch 5 is closed.

Figure 5:
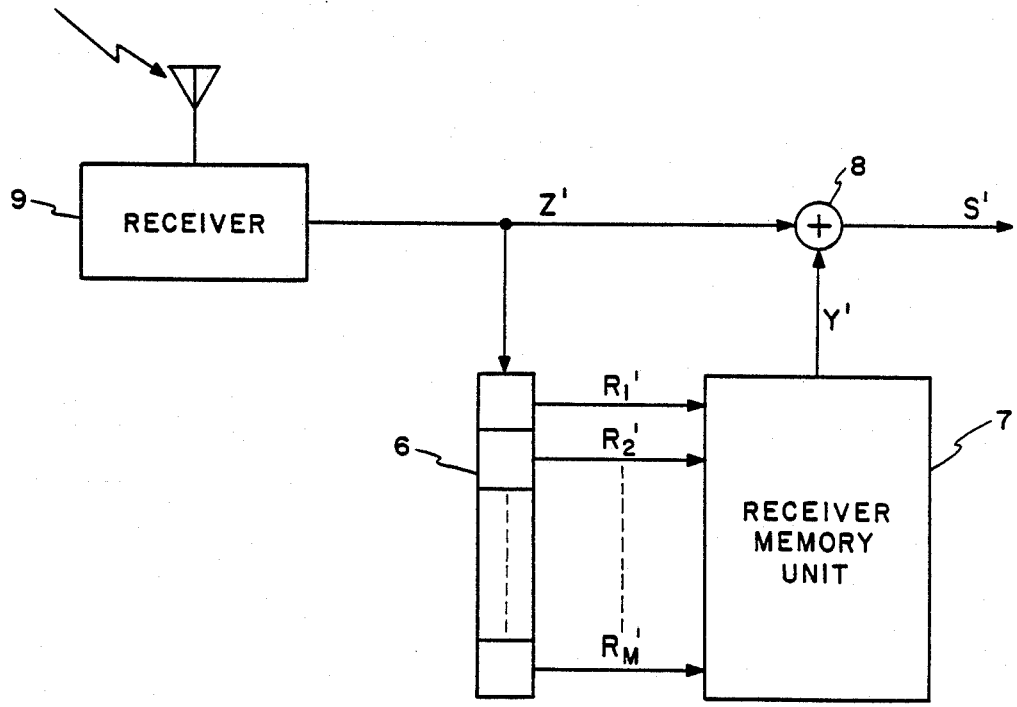
FIG. 5 is a block diagram of a communications receiving system employing a prior art decryption device.

In the prior art decoder receiving system of FIG. 5, a received digital signal Z' is output by a receiver 9. The received signal Z' is input to an M bit shift register 6 as shift register bits $R'_1, R'_2, \ldots, R'_M$.

A receiver memory unit 7 has $2^M$ addresses, each of which contains a prestored bit. The register bits $R'_1, R'_2, \ldots, R'_M$ are then used in parallel as an input address to memory unit 7, which outputs the prestored random bit at that address as the next bit of a decoding signal Y'.

The received signal Z' is successively combined by an Exclusive OR (XOR) gate 8 with the decoding signal Y' to generate a reproduced signal S'.

The prior art receiving system makes use of a general property of binary digits A and B that (A XOR B) XOR B = A That is, if A and B are any two bits that have been combined by an XOR (Exclusive OR) operation, the way to recover A from the output of the operation is to further XOR the output with B.

Therefore, to enable the digital signal S input to the transmitting system to be reproduced by the receiving system, the prestored random bits of the receiver memory unit 7 of the receiving system are made identical to those stored in the corresponding addresses of the transmitter memory unit 1 of the transmitting system.

The transmitting system sends the signal Z=S XOR Y, the XOR operation being equivalent to mod 2 addition of the binary signals S and Y. When the signal Z is transmitted without error, Z'=Z, and the corresponding bits of registers 3 and 6 are also equal. That is, the register bits used in parallel for the memory addresses are the same at the receiving end as at the transmitting end, $R'_1 = R_1$, $R'_2 = R_2$, ..., $R'_M = R_M$. If the contents of the two memory units 7 and 1 are identical, their corresponding outputs Y', Y will also be identical.

It follows that:

S' = Z'XOR Y' = Z XOR Y = (S XOR Y) XOR Y = S

That is, reproduced signal S' equals the initial input signal S.

In this prior art system, the encryption and decryption operations are controlled by the particular random bit pattern stored in the addresses in memory units 1 and 6. This important controlling bit pattern is called the encryption key variable.

Such conventional encryption/decryption devices have the advantages of simple construction and, because they use nonlinear encryption, an exceptionally high level of message secrecy. However, they have the disadvantage that increasing the number of possible random bit patterns that might be stored in the memories 1 and 7, that is enabling the encryption key variable to have a larger variety of possible values, also increases the system's weakness with respect to transmission errors. For example, in order to increase the variety of random binary bit patterns available for the memories 1 and 7, it is necessary to increase the number of addresses in these memories. Conventionally, the number of bits M used in shift registers 3 and 6 must be increased to add more addresses.

However, increasing the shift register length M can degrade system recovery from transmission errors in the received signal Z'. Until any errors in received signal Z' have passed completely through the M bit shift register 6, they generate errors in the decoding signal Y' output by memory 7. When these errors are being generated, the output signal S' of the receiving system cannot reproduce the proper transmitted information. This blackout or interruption continues for an interval equal to the time it takes to transmit M bits.

Therefore, these systems have the disadvantage that the number of possible values for the encryption key variable cannot be increased without lengthening the duration of the interrupting effect on the reproduced signal S' caused by any transmission error.

FIG. 1 shows a block diagram of a first embodiment of an encryption system that overcomes these problems for use at the transmitting end of a communications link. An XOR (Exclusive OR) gate 10 combines an input digital signal S with a randomized coding signal Y to produce an encrypted digital signal Z.

As part of the encryption, a shift register 12 receives and temporarily stores the successive bits of signal Z as register bits $r_1, r_2, \ldots, r_m$. The m register bits are then provided in parallel as an input memory address to a transmitter memory unit 22. Each of the $2^m$ addresses in memory unit 22 is prestored with a corresponding n bit random number $x_1, x_2, \ldots, x_n$.

The number n is an integer equal to or greater than 2. As each address $r_1, r_2, \ldots, r_m$ is input, encoder memory 22 outputs its corresponding stored random number $x_1, x_2, \ldots, x_n$. Random selection circuit 11 selects from among the n bit random number data $x_1, x_2, \ldots, x_n$ output by memory unit 22 to form each frame of bits of the coding signal Y.

Random selection circuit 11 comprises an encoder frame counter 15, an encoder memory 14, and an encoder selector circuit 13. A frame pulse FP output by a frame sync pulse generator 16 is input as a clock signal to counter 15, which has q bits. The counter bits $b_1, b_2, \ldots, b_q$ are provided in parallel as an input memory address to the encoder memory 14. Each of the $2^q$ addresses in encoder memory 14 is prestored with a corresponding p bit random number $a_1, a_2, \ldots, a_p$. The random number $a_1, a_2, \ldots, a_p$ stored at address $b_1, b_2, \ldots, b_q$ is output to selector circuit 13 to change its selection contents.

In other words, encoder counter 15 and encoder memory 14 together form a random number generator, generating a random number for the selector circuit 13 for each frame of the signal. If desired, a PN (pseudorandom noise) signal generator or the like can instead be used as the random number generator.

Encoding circuit 13 receives each of the n bit random numbers $x_1, x_2, \ldots, x_n$ output by transmitter memory unit 22. Based on the value of random number $a_1, a_2, \ldots, a_p$ for the current frame, random selection circuit 13 selects from among the n bit random number data $x_1, x_2, \ldots, x_n$ output by memory unit 22 to form each frame of bits of the coding signal Y. Signal Y is then combined with input signal S by XOR gate 10 to produce the encrypted digital signal Z.

The encrypted signal Z is input to a frame composing circuit 19, which combines it with a frame sync signal FS and a START signal prefix to produce a TDATA signal for transmission. The frame sync signal FS is generated by a frame sync signal generator 17 in response to a frame sync pulse FP from pulse generator 16. The START signal prefix is generated by a start signal generator 18 in response to the closing of a transmission switch 21. The TDATA signal is then transmitted by a transmitter 20.

Transmission switch 21 is arranged so that, when it is closed, it activates transmitter 20. When switch 21 is first closed, it also sends encoder counter 15 a Clear signal to set it to a preselected initial value.

Figure 3:
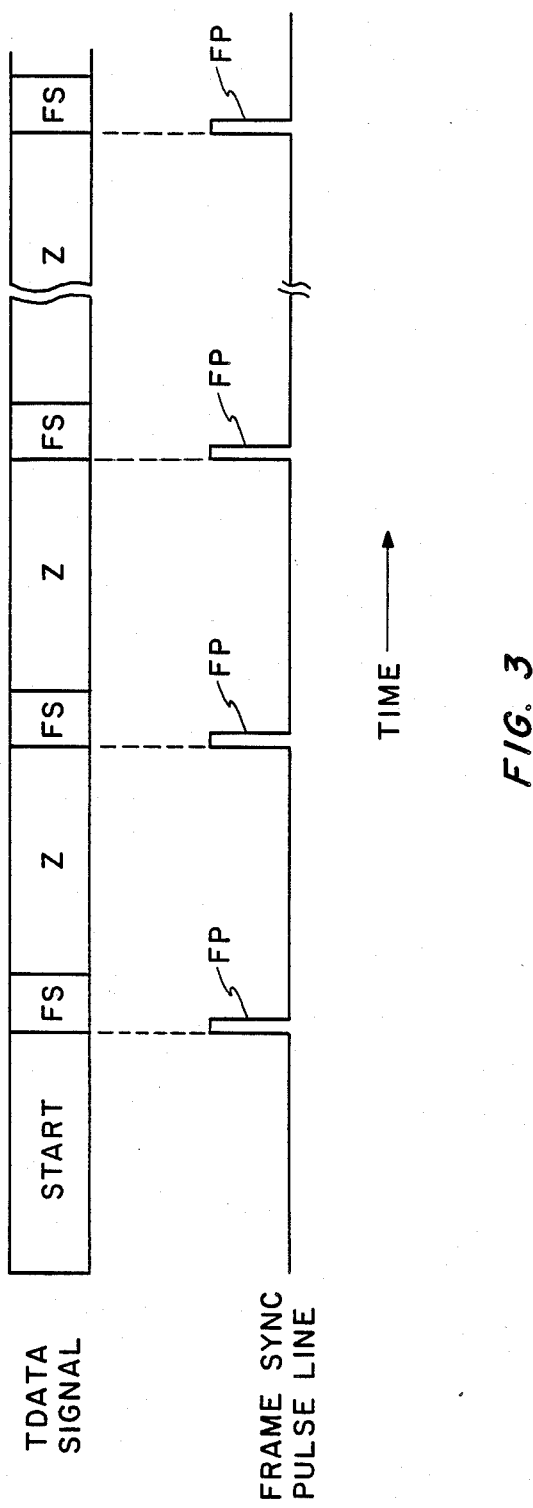
FIG. 3 is a timing chart for use in describing the operation of the systems of FIGS. 1 and 2.

FIG. 3 shows the make-up of each frame of the TDATA signal output as well as its relationship in time to its corresponding frame sync pulse. In FIG. 3, "START" indicates the START signal, "FS" the frame sync signal, "Z" the encrypted signal Z, and "FP" the frame sync pulse.

Figure 2:
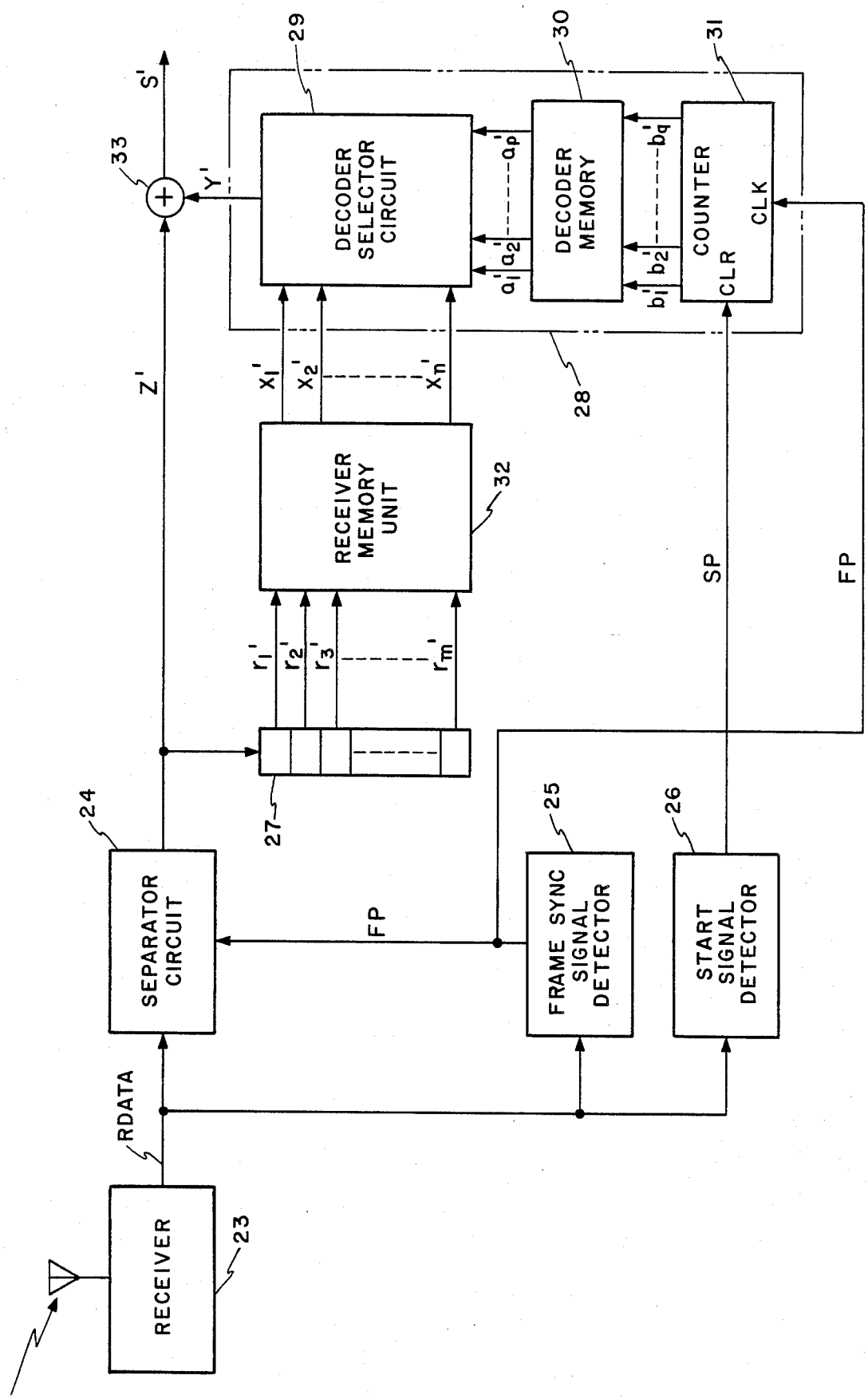
FIG. 2 is a block diagram of a first embodiment of an inventive decryption system for use at the receiving end of a communications link to decode signals transmitted from the system of FIG. 1.

FIG. 2 shows a block diagram of a first embodiment of a decryption system for receiving the signal transmitted by the system of FIG. 1 and reproducing from it the input digital signal S.

A receiver 23 picks up the transmitted signal of FIG. 3 and outputs a received digital signal RDATA. Signal RDATA is input to a separator circuit 24, a frame sync signal detector 25, and start signal detector 26.

Separator circuit 24 separates out a received encrypted signal Z' from the received signal RDATA. If there have been no errors in the transmission path, this signal Z' is identical to the transmitted encrypted digital signal Z.

More particularly, detector 26 detects the START signal prefix at the beginning of the RDATA signal and outputs a start pulse SP. Frame sync signal detector 25 detects each frame signal FS and outputs a frame sync pulse FP. The frame pulses FP output by detector 25 are used to synchronize separating circuit 24 so that for each frame it can separate out just the signal Z' which corresponds to the Z portion of the transmitted signal of FIG. 3.

The frame pulse FP is also provided as a clock signal to a decoder frame counter 31 in decoder random selection circuit 28. The start pulse SP from detector 26 is provided as a Clear signal to counter 31 to set it to a preselected initial value.

The encrypted received signal Z' output by circuit 24 is input to both a shift register 27 and an XOR gate 33. Shift register 27 receives and temporarily stores the successive bits of signal Z' as register bits $r'_1, r'_2, \ldots, r'_m$. These m register bits are then provided in parallel as an input memory address to a receiver memory unit 32.

Each of the $2^m$ addresses in memory unit 32 is prestored with a corresponding n bit random number $x'_1 1$, $x'_2, \ldots, x'_n$. As each address $r'_1, r'_2, \ldots, r'_m$ is input, the random number $x'_1, x'_2, \ldots, x'_n$ stored at that address is output. A decoder selector circuit 29 in random selection circuit 28 receives and selects from among the n bit random number data $x'_1, x'_2, \ldots, x'_n$ output by memory unit 32 to form each frame of bits of a decoding signal Y'. Signal Y' is then provided to the XOR gate 33.

Decoder random selection circuit 28 works exactly like the encoder random selection circuit 11 in the encryption system at the transmitting end. Decoder counter 31 is initialized by a start pulse SP from detector 26 before counting the frame sync pulses FP output by detector 25. The output $b'_1, b'_2 2, \ldots, b'_q$ of counter 31 is provided in parallel as address input to a decoder memory 30 for each frame. This outputs a stored random number $a'_1, a'_2, \ldots, a'_p$ for each address. The random number output $a'_1, a'_2, \ldots, a'_p$ controls the selection contents of decoder selector circuit 29 for each frame.

Based on the value of random number $a'_1, a'_2, \ldots, a'_p$ for the current frame, random selection circuit 29 selects from among the n bit random number data $x'_1, x'_2, \ldots, x'_n$ output by memory unit 32 to form each frame of bits of the decoding signal Y' for XOR gate 33. The XOR gate 33 then combines encrypted received signal Z' with decoding signal Y' to reproduce digital signal S' as the decrypted message signal.

Counter 15 at the transmitting end and counter 31 at the receiving end are each set to the same preselected initial value before they begin counting frame sync pulses. Decoder memory 30 is prestored with the same pattern of random numbers prestored in encoder memory 14. This enables decoder random selection circuit 28 to follow the identical selection routine employed by encoder random selection circuit 11.

Receiver memory unit 32 is prestored with the same pattern of random numbers prestored in transmitter memory unit 22. Therefore, when there are no transmission errors, the reproduced digital signal S' at the receiver end is identical to the digital signal S input at the transmitting end. For no transmission errors, this result is just as in the prior art encoder/decoder system.

The logical working of the decoding mechanism is as follows. When no errors are introduced by the transmission path, the received signal Z' equals the encrypted cipher signal Z. Then shift registers 27 and 12 provide the same address inputs to memory units 32 and 22, having identical contents. Each random number $x'_1, x'_2, \ldots, x'_n$ output by receiver memory unit 32 is identical to the random number $x_1, x_2, \ldots, x_n$ previously output by transmitter memory unit 22.

Since the contents of decoder memory 30 are identical to those of encoder memory 14, decoder random selection circuit 28 can duplicate the working of encoder random selection circuit 11. This enables randomized signal Y' to be identical to randomized signal Y.

It follows that:

$$S' = Z' \text{ XOR } Y' = Z \text{ XOR } Y$$
$$= (S \text{ XOR } Y) \text{ XOR } Y = S$$

In the above embodiment not just the contents of memory units 22, 32 are used as a variable coding/decoding parameter that depends on the encrypted message at an earlier time. The contents of memories 14 and 30 are also used. Therefore, the amount of random numbers stored in memory units 22, 32 can be reduced. That is, the number of addresses in memory units 22, 32 can be less than used in the prior art memory units 1 and 7 of FIGS. 4 and 5.

Figure 4:
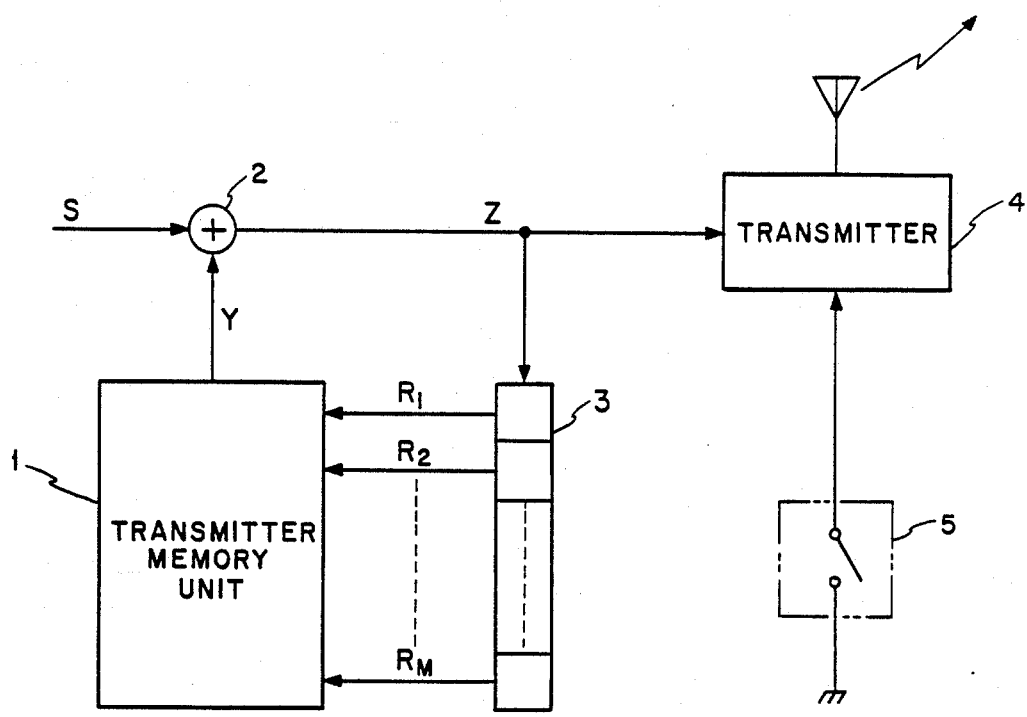
FIG. 4 is a block diagram of a communications transmitting system employing a prior art encryption device.

This enables shift registers 12, 27 to have only m bits, where m is less than the usual M bits used in prior art shift registers 3 and 6 of FIGS. 4 and 5. If an error is generated in the transmission path, it causes errors in the decoding signal Y' for a time interval equal to the time it takes to transmit m bits. However, because the number of bits m in register 27 can be less than the usual M bits, the amount of time that the received signal S' is not properly reproduced is reduced.

Moreover, the number of bits n stored at each memory address can be selected to be a relatively small number as compared to the address length m, reducing the complexity of encoder selector circuit 13 and decoder selector circuit 29.

To the extent that the frame sync signal remains reliable, the variety of random numbers stored in the encoder memory 14 and decoder memory 30 can be made very large. This effectively gives the encryption key variable a large number of possible values without increasing the errors in decoding signal Y' or the reproduced digital signal S'.

The present invention not only randomizes individual signal bits in the transmitted signal but also changes the selection rule used by encoder random selection circuit 11 to form encoding signal Y for each frame of the message. This ensures an exceptionally strong level of message secrecy without greatly increasing the errors in reproduced digital signal S'. The number of different values for the encryption key variable of the coder/encoder is greatly increased without sacrificing the system's prompt recovery from any transmission channel errors.

In the encryption system of FIG. 1, a cipher feedback loop comprising, in order, a register (12), a transmitter memory unit (22), and a random selection circuit (11) provides the randomized coding signal Y. Similarly, in the decryption system of FIG. 2, the decoding signal Y' is provided by a cipher feedback loop comprising, in order, a register (27), a transmitter memory unit (32), and a random selection circuit (28).

Figure 6:
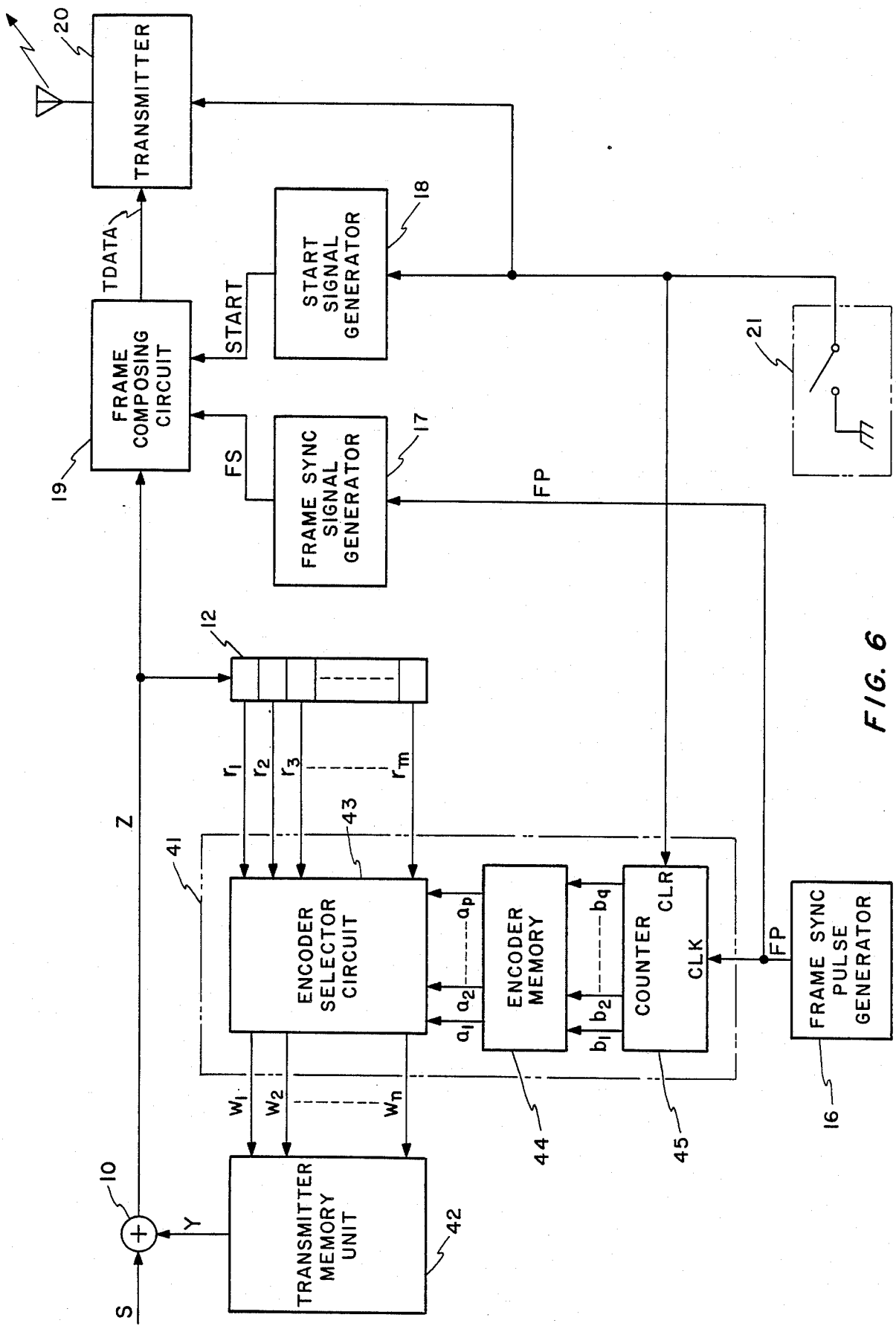
FIG. 6 is a block diagram of a second embodiment of the inventive encryption system for use at the transmitting end of a communications link.

FIG. 6 shows a second embodiment of the inventive encryption system having a different cipher feedback loop comprising, in order, a shift register 12, a random selection circuit 41, and a transmitter memory unit 42. The remaining portions of the second embodiment of the encryption system are identical to those shown in FIG. 1 for the first embodiment, as indicated by use of identical reference numerals.

More particularly, shift register 12 stores and outputs in parallel a predetermined number of bits m of the encrypted signal Z output from the XOR gate 10. For each signal frame, random selection circuit 41 randomly selects from among the m bit number data output by shift register 12 and outputs corresponding n bit address numbers $w_1, w_2, \ldots, w_n$, where n is an integer equal to or greater than 2.

Transmitter memory unit 42 receives the n bit addresses and for each address $w_1, w_2, \ldots, w_n$ outputs a corresponding random bit prestored at the address. The successive bits output by memory unit 42 make up the randomized coding signal Y.

Random selection circuit 41 has a frame counter 45 fed by frame sync pulses FP from a frame sync pulse generator 16. The output of frame counter 45 is a q bit number $b_1, b_2 \ldots, b_q$ for each frame. An encoder memory 44 receives the q bit output of counter 45 as an address. It outputs a p bit random number $a_1, a_2, \ldots, a_p$ prestored at that address to a selector circuit 43 which executes the selection made by selection circuit 41. The selection rule of selector circuit 43 is controlled by the value of random number $a_1, a_2, \ldots, a_p$ for the current frame. In effect, counter 45 and encoder memory 44 generate a p bit random number $a_1, a_2, \ldots, a_p$ for each frame for controlling selector circuit 43.

As the remaining portions of the second embodiment of the encryption system function like those shown in FIG. 1 for the first embodiment, their operation will not again be described.

Figure 7:
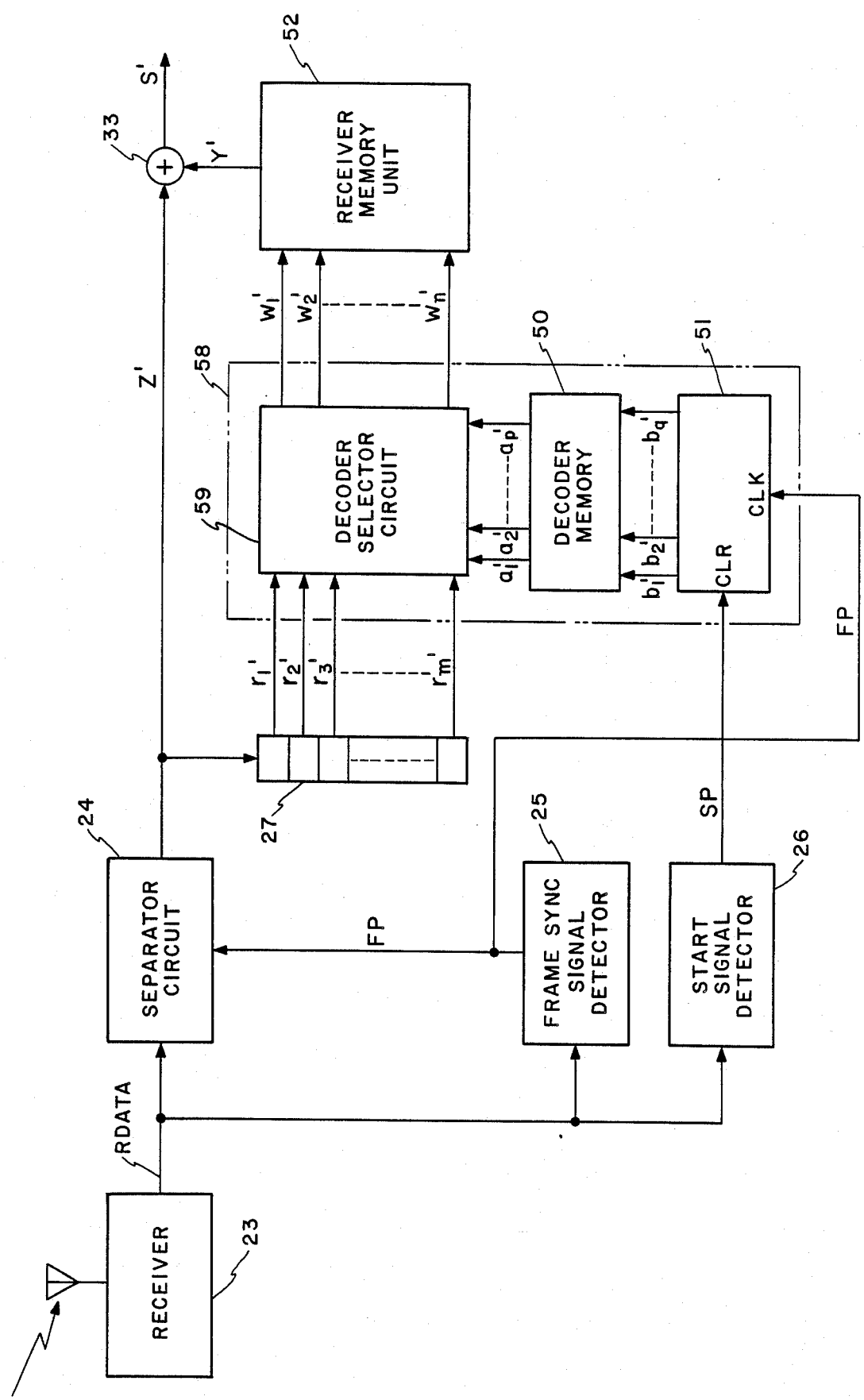
FIG. 7 is a block diagram of a second embodiment of the inventive decryption system for use at the receiving end of a communications link to decode signals transmitted by the system of FIG. 6.

FIG. 7 shows a second embodiment of the inventive decryption system for use at the receiving end of a communications link to decode signals transmitted by the system of FIG. 6. This decryption system has a cipher feedback loop comprising, in order, a shift register 27, a random selection circuit 58, and a receiver memory unit 52. The remaining portions of the second embodiment of the decryption system are identical to those shown in FIG. 2 for the first embodiment, as indicated by use of identical numerals.

More particularly, shift register 27 stores and outputs in parallel a predetermined number of bits m of the received encrypted signal Z' output from separating circuit 24. For each signal frame, the selection circuit 58 selects from among the m bit number data output by shift register 27 and outputs corresponding n bit address numbers $w'_1, w'_2, \ldots, w'_n$.

Receiver memory unit 52 has stored contents identical to that of transmitter memory unit 42 (FIG. 6). Memory unit 52 receives the n bit addresses and for each address $w'_1, w'_2, \ldots, w'_n$ outputs a corresponding random bit (0 or 1) prestored at the address. The successive bits output by memor unit 52 make up the decoding signal Y'.

Selection circuit 58 operates the same way as random selection circuit 41 and in sync with a corresponding frame of the encrypted signal Z. Circuit 58 has a frame counter 51 fed by frame sync pulses from a frame sync signal detector 25. The output of frame counter 51 is a q bit number $b'_1, b'_2 \ldots, b'_q$ for each frame. A decoder memory 50 has stored contents identical to that of encoder memory 44 (FIG. 6).

Decoder memory 50 receives the q bit output of counter 51 as an address. It outputs a p bit number $a'_1, a'_2, \ldots, a'_p$ prestored at that address to a selector circuit 59 which executes the selection made by selection circuit 58. The selection rule of selector circuit 59 is controlled by the value of random number $a'_1, a'_2, \ldots, a'_p$ for the current frame. In effect, counter 51 and decoder memory 50 generate a p bit number $a'_1, a'_2, \ldots, a'_p$ for each frame for controlling selector circuit 59.

Since the remaining portions of the second embodiment of the decryption system function like those shown in FIG. 2 for the first embodiment, their working will not again be described. The stored contents and working of the decryption system are chosen to replicate those of the encryption system. When there are no transmission errors the received encrypted signal Z' equals the encrypted signal Z, and the decoding signal Y' equals the randomized encoding signal Y.

Therefore, when there are no transmission errors the signal S' reproduced by the second embodiment of the decryption system equals the signal S input to the companion encryption system:

$$S' = Z' \text{ XOR } Y = Z \text{ XOR } Y$$
$$= (S \text{ XOR } Y) \text{ XOR } Y = S$$

As in the first embodiment, the second embodiment of the encryption and decryption systems enables the number of values for the encryption key variable to be increased without increasing the number of bits m used in the shift registers 12 and 27. Instead, the additional randomizing key information is provided in the encrypter by the working of selector circuit 43, transmitter memory 42, encoder memory 44, and frame counter 45, and their counterparts in the decryption system.

Moreover, the number of bits n in address numbers $w_1, w_2, \ldots, w_n$ and $w'_1, w'_2, \ldots, w'_n$ can be selected to be a relatively small number as compared to the address length m, reducing the complexity of transmitter memory unit 42 and receiver memory unit 52.

Those who are skilled in the art will readily perceive how to modify the invention. Therefore, the appended claims are to be construed to cover all equivalent structures which fall within the true scope and spirit of the invention.

The invention claimed is:

1. An encryption/decryption system for encrypting an input digital signal at a transmitting end of a communications channel and for reproducing the input signal at a receiving end of said channel, said system comprising: at the transmitting end:

encrypted signal composing means for combining a randomized coding signal with the input digital signal to form an encrypted signal which is segmented into frames;

first register means for storing a predetermined number of bits m of the encrypted signal output from the composing means and for outputting a plurality of the stored bits in parallel;

first memory means for receiving the output from the first register means as an address input and for outputting a corresponding prestored n bit random number for each of the various input addresses, where n is an integer which is at least 2;

first random number generator means for locally generating a first random number for each frame; and first selecting means for randomly selecting based on said first random number an output from among the n bit random number data output by the first memory means, to form a frame length of bits of the randomized coding signal; and at the receiving end:

second register means for storing m bits of a received encrypted signal and outputting a plurality of the stored bits in parallel;

second memory means for receiving the output from the second register means as an address input and for outputting a corresponding prestored n bit random number for each of the various input addresses, the stored contents of the first and second memory means being identical;

second random number generator means for locally generating a second random number for each frame in sync with a corresponding frame of the encrypted signal;

second selecting means, operating the same way as the first selecting means, for selecting based on said second random number an output from among the random number the output by the second memory means, to provide a decoding signal by forming a frame of bits in sync with a corresponding frame of the encrypted signal; and digital signal reproducing means for combing the received encrypted signal with the decoding signal to reproduce the input digital signal.

2. The encryption/decryption system of claim 1 wherein the first selecting means has a first selector circuit controlled in accordance with the random number output of the first random number generator means for selecting one output from among the n bit random number data output by the first memory means; and the second selecting means has a second selector circuit controlled in accordance with the random number output of the second random number generator means for selecting one output from among the n bit random number data output by the second memory means.

3. An encryption/decryption system for encrypting an input digital signal at the transmitting end of a communications channel and for reproducing the input signal at the receiving end, said system comprising: at the transmitting end:

encrypted signal composing means for combining a randomized coding signal with the input digital signal to form an encrypted signal segmented into frames;

first register means having storing contents comprising a predetermined number of bits m of the encrypted signal output from the composing means and for outputting a plurality of the stored bits in parallel;

first random number generator means for locally generating a first random number for each frame;

first selecting means for randomly selecting based on said first random number an output, for each signal frame, responsive to the m bit number data output by the first register means and for outputting corresponding n bit address numbers, where n is an integer which is at least 2; and first memory means for producing the bits of the randomized coding signal responsive to receiving the n bit addresses output from the first selecting means by outputting for each address a corresponding random bit which is prestored at the address; and at the receiving end:

second register means for storing m bits of a received encrypted signal and for outputting a plurality of the stored bits in parallel;

second random number generator means for locally generating a second random number for each frame in sync with a corresponding frame of the encrypted signal;

second selecting means, operating the same way as the first selecting means and in sync with said corresponding frame of the encrypted signal, for selecting based on a second random number an output responsive to the m bit number data output by the second register means and outputting corresponding n bit address numbers;

second memory means, having stored contents which are identical to the contents stored in the first memory means, said second memory means producing a prestored decoding signal responsive to receiving the n bit addresses output from the second selecting means, said second memory means outputting a corresponding random bit prestored at the corresponding address; and digital signal reproducing means for combining the received encrypted signal with the decoding signal to reproduce the input digital signal.

4. The encryption/decryption system of claim 3 wherein the first selecting means has a first selector circuit controlled in accordance with the random number output of the first random number generator means for selecting an output responsive to the output of the first register means; and the second selecting means has a second selector circuit controlled in accordance with the random number output of the second random number generator means for selecting an output responsive to the outputs of the second register means.

5. An encryption/decryption system comprising means for storing a plurality of identical encryption/decryption keys at opposite ends of a communication channel, means for identifying each of said keys in an individually associated address, means for locally generating a random number for each frame, selector means responsive to said random number and to the receipt of an information data word which is transmitted over said channel for selecting an address of a key which is used for encryption/decryption of that data word, means for combining said data word and the key which is stored at the selected address for encrypting/decrypting said data word, and means responsive to a transmission of said information data word for periodically incrementing said key address.

6. The system of claim 5 and means for randomly changing said identical encryption/decryption keys stored at said opposite ends of said communication channel.

7. The system of claim 6 wherein said randomly changeable means comprises a randomly cross wired transmitter and receiver memory unit at said opposite ends of said communication channel.

8. The system of claim 6 wherein information data words are sent in frames, said address selector means comprises a shift register which is incremented responsive to each frame of data words, the output of said shift register indicating said address.

9. The system of claim 8 and encoder means, said shift register means being coupled to drive said random changing means, said random changing means being coupled to drive said encoder means, and said encoder means being coupled to drive said combining means.

10. The system of claim 8 and decoder means, said shift register means being coupled to drive said random changing means, said random changing means being coupled to drive said decoder means, and decoder means being coupled to drive said combining means.

11. The system of claim 8 and encoder means, said shift register being coupled to drive said encoder means, said encoder means being coupled to drive said random changing means, and said random changing means being coupled to drive said combining means.

12. The system of claim 8 and decoder means, said shift register being coupled to drive said decoder means, said decoder means being coupled to drive said random changing means, and said random changing means being coupled to drive said combining means.

13. An encryption/decryption system comprising:
means for storing a plurality of identical encryption/decryption keys at opposite ends of a communication channel;
means for identifying each of said keys by a first address to form first random data, said first address being derived from a randomized digital signal which is segmented into frames;
first generator means for locally generating a first random number for each frame of said randomized digital signal;
first selector means for randomly selecting based on said first random number an output from among said first random data in order to form second random data;
means for combing an input digital signal with said second random data to produce said randomized digital signal;
means responsive to the receipt of the randomized digital signal which is transmitted over said channel for identifying each of said keys by a second address in order to form third random data, said second address being derived from the received randomized digital signal;
second generator means for locally generating a second random number corresponding to said first random number;
second selector means for randomly selecting, based on said second random number an output from among said third random data in order to form fourth random data; and
means for combining said received randomized digital signal with said fourth random data to reproduce the input digital signal.

14. The system of claim 13 wherein, each of said first and second generator means comprises a shift register which is incremented in response to each frame of said randomized digital signal; and a memory unit responsive to the output of said shift register for outputting each of said first and second random numbers.

15. An encryption/decryption system comprising:
means for storing a plurality of identical encryption/decryption keys at opposite ends of a communication channel;
first generator means for locally generating a first random number for each frame of a randomized digital signal which is segmented in frames;
first selector means for randomly selecting based on said first random number an output from among first data to form a first address, said first data being derived from a randomized digital signal;
means for combining an input digital signal with said first random data to produce said randomized digital signal;
second generator means for locally generating a second random number corresponding to said first random number;
second selector means for randomly selecting, based on said second random number an output from among second data to form a second address, said second data being derived from the randomized digital signal which is transmitted over said channel;
means for identifying each of said keys by said second address to form second random data; and
means for combining the received randomized digital signal with said second random data to reproduce the input digital signal.

16. The system of claim 15 wherein each of said first and second generator means comprises a shift register which is incremented in response to each frame of said randomized digital signal; and a memory unit responsive to the output of said shift register for outputting each of said first and second random numbers.

* * * * *